US005167117A

United States Patent [19]

Herzog et al.

[11] Patent Number: 5,167,117

[45] Date of Patent: Dec. 1, 1992

[54] METHOD AND APPARATUS FOR COOLING AN AIRPLANE ENGINE

[75] Inventors: Claus Herzog, München; Rainer R. Schwab, Karlsfeld; Klaus Rüd, Gröbenzell; Harald Mark, Karlsfeld, all of Fed. Rep. of Germany

[73] Assignee: MTU Motoren und Turbinen-Union Muenchen GmbH, Fed. Rep. of Germany

[21] Appl. No.: 631,157

[22] Filed: Dec. 20, 1990

[30] Foreign Application Priority Data

Dec. 20, 1989 [DE] Fed. Rep. of Germany ....... 3942022

[51] Int. Cl.[5] .............................................. F02K 11/00

[52] U.S. Cl. ......................................... 60/204; 60/266; 244/59; 244/209

[58] Field of Search ......................... 60/204, 266, 267; 244/53 R, 59, 62, 74, 209

[56] References Cited

U.S. PATENT DOCUMENTS

| | | | |
|---|---|---|---|
| 2,891,382 | 6/1959 | Broffitt | 60/267 |
| 3,237,400 | 3/1966 | Kuhrt . | |
| 3,317,162 | 5/1967 | Grant | 244/209 |
| 3,377,803 | 4/1968 | Prachar | 60/267 |
| 3,410,092 | 11/1968 | Goldstein | 60/204 |
| 3,721,093 | 3/1973 | Wolf et al. | 60/267 |
| 3,756,024 | 9/1973 | Gay | 60/204 |
| 4,749,150 | 6/1988 | Rose et al. | 244/209 |
| 4,754,601 | 7/1988 | Minovitch | 60/204 |
| 4,807,831 | 2/1989 | Brewer et al. | 60/267 |
| 5,025,623 | 6/1991 | Hirakoso et al. | 60/267 |

FOREIGN PATENT DOCUMENTS

| | | | |
|---|---|---|---|
| 2615903 | 12/1988 | France | 60/267 |

*Primary Examiner*—Richard A. Bertsch
*Assistant Examiner*—Michael I. Kocharov
*Attorney, Agent, or Firm*—Evenson, Wands, Edwards, Lenahan & McKeown

[57] ABSTRACT

An apparatus for cooling components of an airplane engine at least partially operated by a cryogenically stored propellant via cooling air includes an air supply line for supplying the cooling air from an outside environment. A heat exchanger exchanges the cooling air with the propellant to precool the cooling air and includes a condenser having an in-flow and an out-flow side connected to the air supply line for precooling the cooling air. A pump is coupled to a cooling air line for conveying the precooled air in a liquid or vapor state to the components to be cooled wherein the cryogenically stored propellant acts upon the condenser. A propellant tank is connected to the in-flow side of the condenser and stores the cryogenically stored propellant, wherein the out-flow side of the condenser is connected to at least one combustion system of the airplane engine.

13 Claims, 2 Drawing Sheets

METHOD AND APPARATUS FOR COOLING AN AIRPLANE ENGINE

BACKGROUND AND SUMMARY OF THE INVENTION

This invention relates to a method for cooling an airplane engine operated with cryogenically stored propellant by means of cooling air.

The temperatures occurring in an airplane engine for high-speed airplanes (hypersonic airplanes) are extremely high because of the high Mach number. This requires the removal of an extremely high amount of heat in order to maintain the material temperature of the components in the hot are of the engine within permissible technical limits. It is an additional problem that, comparatively, the air temperatures at the air intake of a hypersonic engine, particularly one in hypersonic flight operation and thus exclusively switched-on ramjet propulsion, are extremely high (1,700° C. and higher). Attempting to thermodynamically cool the even hotter engine components in the area of the combustion chamber as well as the turbine and parts connected behind them, such as afterburner elements, by correspondingly heated air cannot be implemented in practice. There is an additional problem in that cooling of the turbine, in particular a high-pressure turbine of the basic turbo-engine, can only take place by means of compressed air which must have approximately the same pressure as the pressure existing in the high-pressure turbine area.

Therefore, in the case of previous cooling concepts such as, for example, conventional gas turbine engines, the cooling air for the turbine is branched off from the compressor. This air, which is heated by the compression process, is fed to a cooling air cooler where it is intermediately cooled while utilizing the cooling capacity of the propellant which is carried along in a liquid state but is burned in a gaseous state. Hydrogen is particularly suitable as a propellant in this case.

This known solution has a number of disadvantages and problems. Since, for an effective cooling, approximately 10 to 20% of the total air mass flow must be branched off behind the compressor for cooling purposes, the cooling air cooler has large structural dimensions and hence a high weight. This is intensified in view of the minimizing of the air-side pressure losses in the heat exchanger. The reason for this is that the pressure loss along the total cooling air path from the compressor to the turbine must not be higher than that of the main flow in order to ensure a sufficient air flow and thus a satisfactory cooling. A blowing-out at the leading edge of the first turbine stator must also be ensured, where not only the highest static pressure but also the highest temperature occurs in the turbine. Finally, under certain flying conditions, there is the general risk of icing problems.

From "Proceedings of the 1st Int. Conference on Hypersonic Flight in the 21st Century", *Grand Fox USA,* 1988, Page 125 and on, it is known to provide an air breathing rocket engine with a condenser which, using the carried-along liquid hydrogen, liquifies the air required for burning this hydrogen.

On the basis of the above-described problems, there is needed a method and apparatus of the above-described type which avoids the above-mentioned problems and permit an improvement of the efficiency and of the cooling. The apparatus should also provide a constructive simplification of the cooling air cooling system.

According to the present invention, these needs are met by operating the airplane engine using a cryogenically stored propellant, taking in cooling air from an outside environment, liquifying said cooling air via a heat exchange with the cryogenically stored propellant to obtain liquified cooling air, increasing the pressure of the liquified cooling air, and supplying the liquified cooling air to the components of the airplane engine to be cooled.

The definition of "environment" in this case means that the cooling air was not compressed in the compressor but flows in from the atmospheric environment directly by way of an opening in the airplane fuselage or engine.

The method according to the present invention is particularly suitable for so-called hypersonic engines, i.e. those which accelerate airplanes to multiple sonic speed. At these speeds, the air at the engine intake already has high temperatures because of the air ram. However, this method is also suitable for conventional engines if cryogenically stored propellant is used.

The essential advantages of this cooling concept are that the pump delivery for the pressure increase of the air in the liquid state is considerably lower than the required compressor delivery for the gaseous air. This amounts to approximately 1/200 of the delivery required for compressing the gaseous air. In addition, the lowering of the cooling air temperatures results in a decrease of the cooling air requirement. Thus, the cooling air requirement can be lowered to approximately half of its previous values, i.e. 5–10% of the air mass flow. In addition, since this amount of air does not flow through the compressor, the structural dimensions of the compressor and therefore the compressor weight may be significantly decreased.

Because of the reduced cooling air flow, it is also advantageous that a smaller enthalpy gradient will occur in the turbine. Thus, in turn, leads to an increased pressure ratio in the nozzle and therefore to an increased thrust. The reason for this is that the reduction of the delivery requirement of the compressor outweighs the decrease of the turbine mass flow caused by the lower cooling air requirement (and thus the air mass flow).

Finally, it is an advantage of the present invention that the compressor intake surface, which determines the aerodynamic frontal drag of the airplane engine, can be decreased by the advantageous mass flow reduction. This has a considerable effect particularly in the case of high flight Mach numbers.

Hydrogen is preferably used as the propellant which is stored cryogenically, thus at very low temperatures, and is transported in the airplane. However, any other propellant which can be stored cryogenically, such as methane, is also suitable for this purpose. The propellant may be cooled to such an extent that it is present in the tank in a partially solidified state of aggregation in the form of slush.

When hydrogen ($H_2$) is used, the temperature of the propellant which is carried along is approximately 20–40K., and the temperature during the injection into the combustion chambers is up to 1,000K. When hydrogen is used, the propellant, at the start of the heat exchange and thus while entering into the condenser, is preferably gaseous because the high specific heat capacity of the hydrogen is utilized. However, as an alternative, it is also possible to first evaporate the propellant in the condenser and thus utilize the evaporation enthalpy of the propellant.

In an advantageous further embodiment of the invention, the cooling air is branched off in front of the compressor of the airplane engine. In particular, air is branched off from the intake boundary layer of the engine. This advantageously reduces the installation losses in the area of the engine intake, and the intake cross-section may be reduced.

In an alternative further embodiment of the invention, the cooling air is branched off from the fuselage boundary layer of the airplane. As a result, the intake cross-section of the airplane engine can advantageously be reduced. Further, a duct, which up to now had been required for the removal of the fuselage boundary layer, is no longer required or may be reduced. As a result, this arrangement permits an advantageous use of the boundary layer flow which up to now had only caused losses and cooling problems in the area of the duct.

The apparatus of the present invention includes an air supply line for the supply of cooling air. The air supply line has a connection to the environment and is connected with a condenser. The liquified cooling air can be conveyed from the condenser by way of a pump and a cooling air line. The liquified cooling air can be in a liquid or vapor state and conveyed to the components to be cooled. In this case, the condenser can be driven by means of cryogenically stored propellant which can be fed by way of an inflow line and can be removed by way of an outflow line.

The resulting advantages correspond essentially to those described above concerning the method.

The condenser is preferably constructed as a countercurrent heat exchanger or as a cross-type/countercurrent heat exchanger in order to achieve a rate of exchange that is as high as possible.

Other objects, advantages and novel features of the present invention will become apparent from the following detailed description of the invention when considered in conjunction with the accompanying drawings.

DETAILED DESCRIPTION OF THE DRAWINGS

Figure 1:
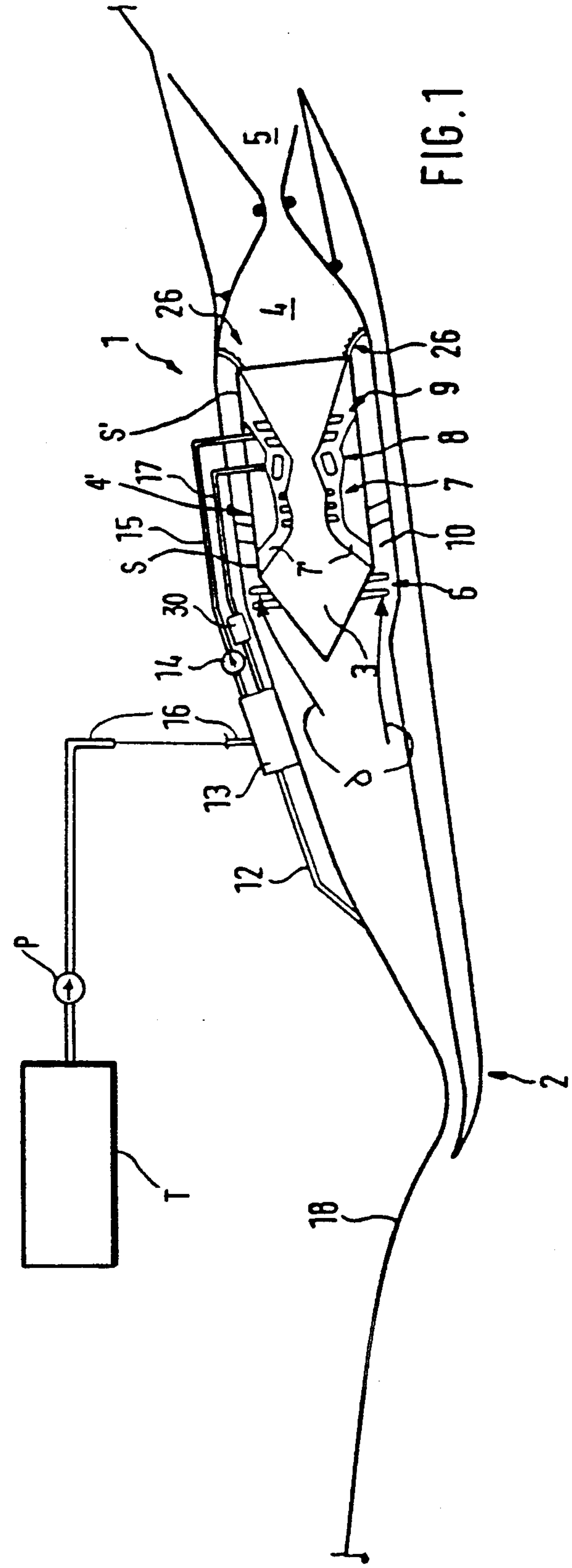
FIG. 1 is a schematic longitudinal sectional view of an airplane engine.

FIG. 1 is a schematic longitudinal sectional view of an airplane engine 1 used for hypersonic operation. The engine 1 essentially includes an engine intake area 2, a core engine 3 constructed as a turbo fan engine, an afterburner 4, and a preferably adjustable propelling nozzle 5.

In the embodiment shown in FIG. 1, the core engine 3 is constructed as a turbofan engine which includes a two-stage fan 6, a compressor 7 for the core air flow, a combustion chamber 8 and a high-pressure and low-pressure turbine 9.

At low flight Mach numbers, the engine 1 operates as a conventional turbofan engine with a bypass duct 10 in which the fan 6 delivers compressed fan air. At higher flight Mach numbers, i.e. those for hypersonic flight and exclusively switched-on ramjet engine, arrangements are also made which, at sections S, S' (shown in FIG. 1 in a closed condition), permit a closing-off of the core engine 3 and an operation of the airplane engine 1 as a ramjet engine. In this case, only the afterburner 4 is switched on. The afterburner 4 is arranged in a jet pipe section located between the downstream end of the core engine and the duct 10 on one hand, and the propelling nozzle 5, on the other hand. When the ramjet operation is switched on by means of the afterburner 4, the core engine 3 together with the fan 6 shut down and the bypass duct 10 is acted upon by compressed air D (FIG. 1). The compressed air D is captured and retained at the intake area 2 and, while fuel is supplied 26, is afterburned or additionally burned in the pipe section of the afterburner 4.

The arrangement according to the present invention has an air supply line 12 communicating with the engine intake 2 and connecting to a condenser 13 The outlet of the condenser 13 for the liquid cooling air is connected with a pump 14 which, by way of a cooling air line 15, is coupled with the components of the core engine 3 to be cooled. These core components are in particular the turbine 9, but can also include other components, such as the propelling nozzle 5, the fan 6, the wall of the bypass duct 10 or of the core engine 3 or the corresponding shut-off devices at points S, S' (FIG. 1).

Figure 2:
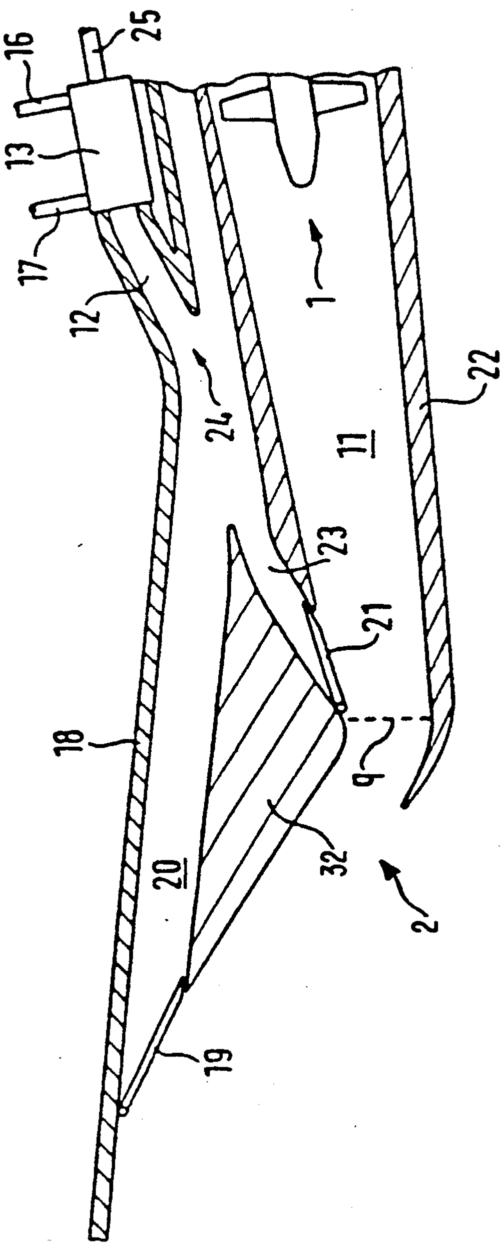
FIG. 2 is a sectional view of the intake area of an airplane engine.

The heat conveyed during the liquefaction of the air is absorbed in the condenser 13 by the propellant carried along in a liquified state and flowing through the condenser 13 while possibly evaporating. For this purpose, at least one inflow line 16 for the liquid or gaseous propellent and an outflow line 17 for the evaporated propellant are connected to the condenser 13. A propellant metering unit 30 is switched into the outflow line 17. The outflow line 17 may be connected exclusively with injection arrangements 26 of the afterburner 4 as shown in FIG. 2. In certain constructions, the outflow line 17 may also selectively supply the combustion chamber and the injection arrangements 26 of the afterburner 4 with propellant (FIG. 1).

FIG. 2 shows an embodiment of an inflow arrangement into the condenser 13 in the intake area of the hypersonic engine 1. At a fuselage wall 18 of the airplane (not shown), a hinged flap 19 is mounted which can open up a boundary layer duct 20 having a rectangular cross-section.

The intake wall 32 connects to this hinged flap 19. It is possible to construct the intake wall 32 such that it is adjustable for adjusting the narrow cross-section q. Behind the narrow cross-section q, a suction flap 21 is mounted in the wall of the engine intake 2. This suction flap 21 may be opened for the sucking-off of the flow boundary layer.

The engine intake 2 is bounded by the outer wall 22 and, in the direction of the engine 1, changes from a rectangular cross-section to a round or oval cross-section. Behind the suction flap 21, a suction duct 23 is provided which connects with the boundary layer duct 20.

The air supply line 12, by way of an inflow opening 24, projects at least into a portion of the boundary layer duct in order to guide the air approaching in the boundary layer duct 20 and/or the suction duct 23 into the condenser 13. However, other suction arrangements may also be used, and, if required, a guide flap may be provided which guides a variable proportion of the air flowing in ducts 20 and 23 into the condenser 13.

A line 25 connects the outlet of the condenser 13 with the pump for the liquified air (not shown in FIG. 2). The condenser 13 supplies the components of the airplane engine 1 to be cooled with air in the vapor or liquid states.

In order to maintain the liquid air delivered by the pump 14 in a constant liquid state along the course of the line 15 (FIG. 1), it is expedient, for example, to completely thermally insulate this line with respect to local heat radiation from the engine or the ram pressure air. By locally leaving out pipe insulations located downstream of the pump 4, the initially liquid cooling air may be processed to assume a vapor state.

Referring back to FIG. 1, it should also be noted that the propellant, for example hydrogen, is supplied to the condenser 13 from a propellant tank T, by means of a pump P via line 16.

Figure 3:
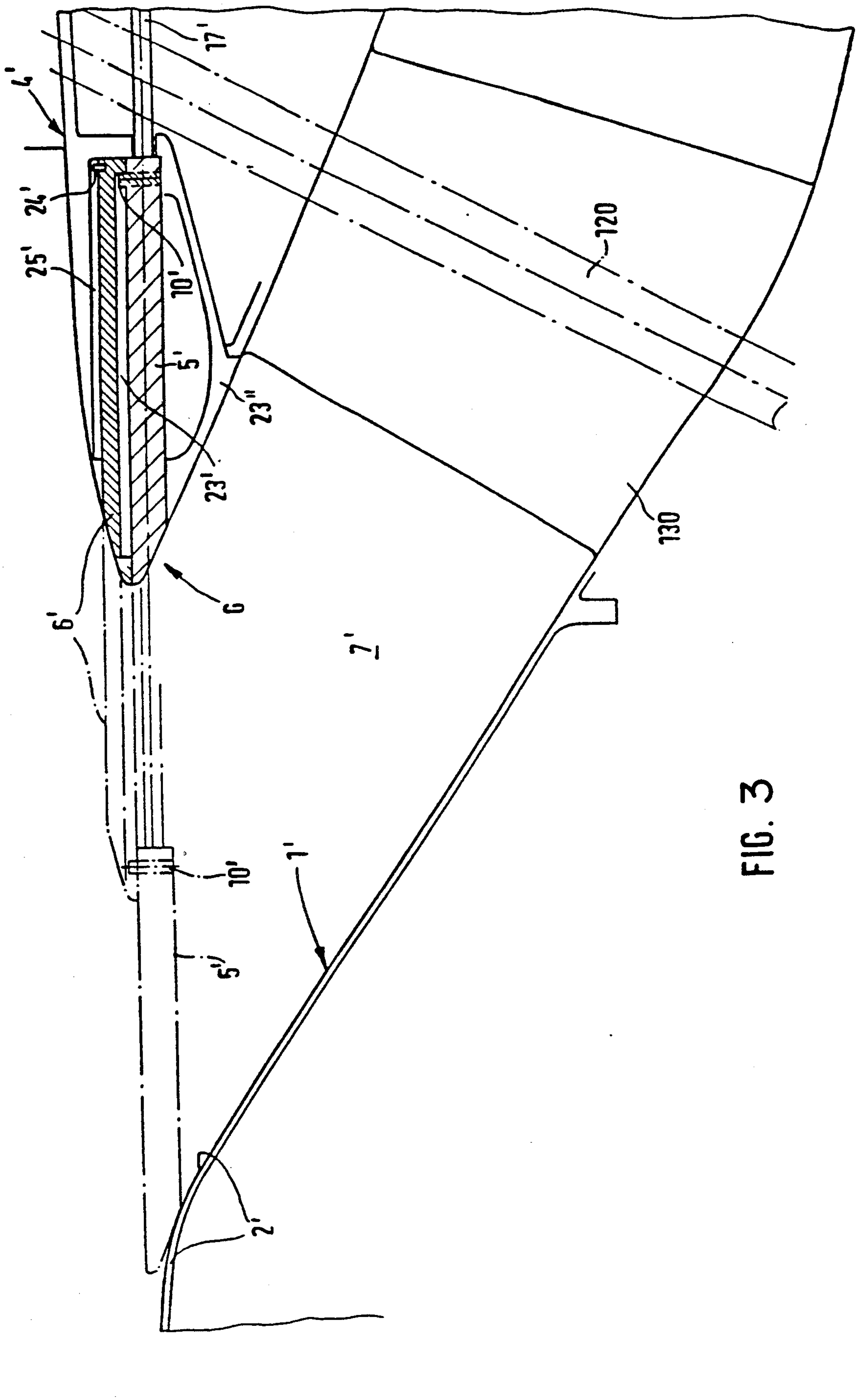
FIG. 3 is a schematic sectional view showing in greater detail a shut-off device frontally arranged at the core engine, the shut-off device being shown using phantom lines in two different end positions.

With respect to the arrangements for shutting-off the core engine 3 (FIG. 1), for example in Section S, FIG. 3 embodies in greater detail a telescope-type annular slide valve arrangement. According to this telescope-type annular slide valve arrangement, a casing lip G is a component of a casing body 23'' of the engine shroud 4' into which both rings 5', 6' move completely while exposing a ring-shaped inflow duct 7' to the compressor 7 (FIG. 1). Thus, in this position, the frontal rounded surface contours of the rings 5', 6', provide at the same time the end contour of the lip G with an aerodynamically favorable shape. Several tension-pressure rods 17' which are connected with pneumatically or hydraulically actuated adjusting elements and are uniformly distributed over the circumference are applied to the respective inner ring 5'. The inner ring 5' is moved out first during the shut-off procedure. Pins 10' located at the inner ring 5' engage in longitudinal grooves 23' of the outer ring 6' for driving purposes (see dash-dotted moved-out position). Additional axial grooves 23' are developed in the casing body 23'' as limit stops for limiting the maximum outward movement of both rings 5', 6'. Specifically, the opposite rear fixed pins 24' on the outer ring 6' engage in the grooves 25'. Reference number 120 in FIG. 3 is an equipment drive shaft or output shaft extending through a supporting blade 130.

In a comparable or similar manner, the shut-off device on section S' (FIG. 1) may also be constructed in the manner of a telescope or an annular slide valve. In this case, corresponding rings would have to axially move out from left to right for shutting off the gas outlet of the turbines 9 with respect to the bypass duct 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for cooling components of a turboramjet engine including a compressor means, the method comprising the steps of:

operating the turboramjet engine using a cryogenically stored propellant;

taking in cooling air from boundary air flow in front of the compressor means of the turboramjet engine;

liquefying said cooling air via a heat exchange with said cryogenically stored propellant to obtain liquified cooling air;

increasing the pressure of said liquified cooling air; and supplying said liquified cooling air to the components of the turboramjet engine to be cooled.

2. A method according to claim 1, wherein the step of operating is carried out with a hydrogen propellant.

3. A method according to claim 1, wherein the step of liquifying comprises the steps of:

using cooling air in a gaseous state of aggregation before said heat exchange; and obtaining said liquified cooling air after the heat exchange, said liquifying cooling air being in a liquid state of aggregation.

4. A method according to claim 1, wherein after the step of increasing the pressure, the method comprises the steps of:

first leaving said liquified cooling air in the liquid state of aggregation; and vaporizing said liquified cooling air only during the step of supplying the liquified cooling air in the component cooling process.

5. A method according to claim 1, wherein the boundary air flow is at least one of fuselage boundary layer air and intake boundary layer air.

6. A method for cooling components of a turboramjet engine including a compressor means, the method comprising the steps of:

operating the turboramjet engine using a cryogenically stored propellant;

taking in cooling air from boundary air flow in front of the compressor means of the turboramjet engine;

liquefying said cooling air via a heat exchange with said cryogenically stored propellant to obtain liquefied cooling air;

increasing the pressure of said liquified cooling air;

vaporizing the liquified cooling air via the local temperature increase from the turboramjet engine to provide vaporized cooling air; and supplying said vaporized cooling air to the components of the turboramjet engine to be cooled.

7. An apparatus for cooling components of a turboramjet engine, including a compressor means, at least partially operated by a cryogenically stored propellant via cooling air, comprising:

an air supply line for supplying the cooling air from boundary air flow in front of the compressor means of the turboramjet engine;

means for heat exchanging the cooling air with the propellant to precool the cooling air including a condenser having an in-flow and an out-flow side connected to said air supply line for precooling the cooling air;

a cooling air line;

a pump coupled to said cooling air line for conveying the precooled air in a liquid or vapor state to the components to be cooled;

wherein the cryogenically stored propellant acts upon said condenser;

a propellant tank connecting to the in-flow side of said condenser and storing the cryogenically stored propellant;

wherein said out-flow side of said condenser is connected to at least one combustion system of the airplane engine.

8. An apparatus according to claim 7, wherein said air supply line is embedded in a fuselage wall of an airplane operated by the turboramjet engine, for taking in fuselage boundary layer air as the cooling air.

9. An apparatus according to claim 8, further comprising a boundary layer duct provided between said fuselage wall and the turboramjet engine which is connected with the air supply line.

10. An apparatus according to claim 7, further comprising a suction duct connected with the air supply line, said suction duct being embedded in an engine intake, for taking in an intake boundary layer air as the cooling air.

11. An apparatus according to claim 10, wherein said suction duct for said intake boundary layer air is provided on said engine intake in a narrow cross-section area of a wall of said engine intake.

12. An apparatus according to claim 9, wherein said boundary layer duct is closed by pivotable flaps.

13. An apparatus according to claim 11, wherein said suction duct is closed by pivotable flaps.

* * * * *